United States Patent [19]

Ward

[11] 4,324,275

[45] Apr. 13, 1982

[54] RETROFITTING METHODS AND RETROFITTED HYDRAULIC DRIVES

[76] Inventor: John D. Ward, 997 E. Athens St., Altadena, Calif. 91001

[21] Appl. No.: 110,281

[22] Filed: Jan. 7, 1980

[51] Int. Cl.[3] .................................... F16K 5/04

[52] U.S. Cl. .................................... 137/876; 173/169; 60/494; 251/148

[58] Field of Search .................................... 173/169; 91/437; 60/144; 415/144, 145, 39; 137/599, 599.1, 269, 315, 876, 884; 251/148, 309

[56] References Cited

U.S. PATENT DOCUMENTS

| | | | |
|---|---|---|---|
| 280,247 | 6/1883 | See | 60/494 |
| 900,479 | 10/1908 | Burhorn | 415/144 |
| 2,579,656 | 12/1951 | Douglas et al. | 137/599.1 X |
| 2,672,847 | 3/1954 | Bergmann | 173/169 X |
| 3,451,218 | 6/1969 | Grant | 60/494 X |
| 3,589,387 | 6/1971 | Raymond | 137/884 |
| 4,175,909 | 11/1979 | White | 415/145 |

*Primary Examiner*—William R. Cline

*Attorney, Agent, or Firm*—Benoit Law Corporation

[57] ABSTRACT

A hydraulic drive is retrofitted with an on-off switching facility. To this end, a block is provided having a front portion fitting the drive at adjacent inlet and outlet openings and having a rear portion opposite the front portion. The block is provided with a first through-opening leading from the rear portion to the front portion for communication with the inlet opening, and with a second through-opening leading from the rear portion to the front portion for communication with the outlet opening. The first through-opening at the rear portion of the block is adapted for reception of a fitting or a hydraulic fluid delivery hose which ordinarily would have been received in the above mentioned inlet opening. Similarly, the second through-opening is adapted at the rear portion of the block for reception of a further fitting for a hydraulic fluid return hose which would otherwise have been received in the above mentioned outlet opening. The block is provided with a valve being manually actuable between an open position providing an interconnection between the through-openings for deactivating the drive and enclosed position blocking that interconnection for reactivation of the drive. The block is mounted on the drive with the front portion fitting the drive at the inlet and outlet openings, the first through-opening communicating with the inlet opening, and the second through-opening communicating with the outlet opening.

18 Claims, 5 Drawing Figures

RETROFITTING METHODS AND RETROFITTED HYDRAULIC DRIVES

BACKGROUND OF THE INVENTION

1. Field of the Invention

The subject invention relates to hydraulic drives, tools and other hydraulic equipment, to methods and apparatus for retrofitting hydraulic drives and tools, to retrofitted hydraulic drives and tools and methods for retrofitting a hydraulic drive with an on-off switching or valving facility.

2. Disclosure Statement

This disclosure statement is made pursuant to the duty of disclosure imposed by law and formulated in 37 CFR 1.56(a). No representation is hereby made that information thus disclosed in fact constitutes prior art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention.

Hydraulic drives generally are propelled by oil or another hydraulic fluid which is delivered to the drive by a delivery hose or line, to be removed from the drive by a return hose or line. Frequently, the hydraulic fluid is stored in a reservoir and is pressurized by a pump which propels the fluid from the reservoir to the drive.

While hydraulic drives have many advantages, they do lack an on-off switching device that would be as convenient, compact and inexpensive as an electric motor on-off switch. Since many hydraulic drives and tools are operated at a distance from the hydraulic power source, there exists a need for a conveniently and safely actuable control facility right at the tool or drive itself.

In response to such need, the delivery and return hoses have sometimes been cut in the vicinity of the tool and have there been provided with a manually actuable valve having an open position for providing an interconnection between the delivery and return hoses, and an alternative closed position blocking that interconnection. In the open position of that valve, the hydraulic drive was effectively bypassed, thereby deactivating the drive. In the valve's closed position, fluid was free to flow to and from the drive through the delivery and return hoses, respectively.

One drawback of such a makeshift approach was its requirement of several fittings at the actuable bypass valve location. Another drawback was the floating character of the valve between frequently dangling hoses. This has raised the question whether such an on-off valving facility would always be safely operable.

Another, perhaps even more serious drawback of such an approach stems from its makeshift character. Thus, the high pressure building up at the inserted bypass valve in its closed position frequently caused lines to break, discharging the hydraulic fluid over the environment and endangering the working crew. Also, there was no assurance that personnel cutting into hoses or otherwise providing a bypass valve therebetween would in fact use a valve appropriate to the particular tool or drive.

For instance, if a valve suitable for a small tool would be used for a large drive, there was the danger that the valve in its open position would not completely bypass the drive, so that the same could start operating despite a supposedly "off" condition, thereby exposing the operator to damage or injury. In this respect, a matter of primary concern to the manufacturer was simply beyond the manufacturer's control.

In some hydraulic tools, these drawbacks have been alleviated by the manufacturer's providing manually actuable valving at the particular tool itself. In practice, such valving has been provided at or near a tool handle. Typically, such valving is of a type which has to be constantly engaged to remain in an active position, and which will automatically revert to its rest position upon release of the manual engagement. This is, however, not always convenient in practice, particularly not in instances where a continuous presence of the worker's or operator's hand at the machine would be burdensome or dangerous.

Also, the special provision of valving at particular tool handles does not generally represent a feasible, convenient or effective approach for retrofitting hydraulic drives with a valving facility.

A growing need for retrofitting facilities of hydraulic drives has, consequently, remained unsatisfied prior to the subject invention.

SUMMARY OF THE INVENTION

It is a general object of this invention to overcome the advantages and meet the needs expressed or implicit in the above mentioned disclosure statements or other parts hereof.

It is a germane object of this invention to provide improved hydraulic drives and tools.

It is a related object of this invention to provide improved methods of retrofitting hydraulic drives and tools.

It is also an object of this invention to provide improved hydraulic drives, including drives retrofitted by the latter methods.

It is a related object of this invention to retrofit hydraulic drives with improved valving or on-off switching facilities.

Other objects will become apparent in the further course of this disclosure.

From a first aspect thereof, the subject invention resides in a method of retrofitting a hydraulic drive having an inlet opening for receiving a first fitting for a hydraulic fluid delivery hose and an adjacent outlet opening for receiving a second fitting for a hydraulic fluid return hose. The invention according to this aspect comprises in combination the steps of providing a block having a front portion fitting the drive at the adjacent inlet and outlet openings, and a rear portion opposite the front portion, and providing such block with a first through-opening leading from the rear portion to the front portion for communication with the inlet opening, and with a second through-opening leading from the rear portion to the front portion for communication with the outlet opening. Further steps in the mentioned combination include the step of adapting at the rear portion the first through-opening for reception of the first fitting and the second through-opening for reception of the second fitting, and providing in the block a valve being manually actuable between an open position providing an interconnection between the through-openings for deactivating the drive and a closed position blocking the interconnection for reactivation of the drive. The block is mounted on the drive with the mentioned front portion fitting the drive at the inlet and outlet openings, while the first through-opening communicates with the inlet opening, and the second through-opening communicates with the outlet opening.

From a related aspect thereof, the subject invention resides in a hydraulic drive having an inlet opening adapted for reception of a first fitting for a hydraulic fluid delivery hose, an adjacent outlet opening adapted for reception of a second fitting for a hydraulic fluid return hose, and means connected between the inlet and outlet opening and driven by the hydraulic fluid. According to this aspect thereof, the subject invention resides in the mentioned hydraulic drive having been retrofitted by the above mentioned methods of the subject invention.

From yet another aspect thereof, the subject invention resides in a hydraulic drive comprising, in combination, an inlet opening adapted for reception of a first fitting for a hydraulic fluid delivery hose, an adjacent outlet opening adapted for reception of a second fitting for a hydraulic fluid return hose, means connected between the inlet and outlet openings and driven by the hydraulic fluid. The combination according to this aspect of the invention includes further a block retrofitted on the drive and having a front portion at the adjacent inlet and outlet openings, and a rear portion opposite that front portion. This retrofitted block has a first through-opening leading from the rear portion to the front portion for communication with the inlet opening and being adapted for reception of the first fitting at the rear portion, and a second through-opening leading from the rear portion to the front portion for communication with the outlet opening and being adapted for reception of the second fitting at the rear portion. According to this aspect of the invention, valve means in the retrofitted block are manually actuable between an open position providing an interconnection between the through-openings for deactivating the driven means and the closed position blocking the interconnection for reactivation of the driven means of the hydraulic drive.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
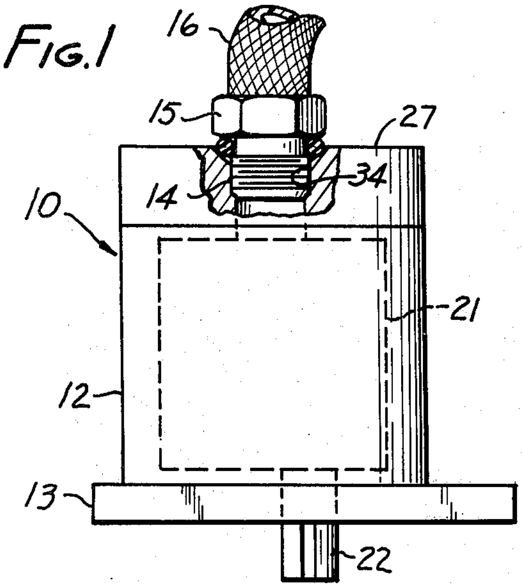
FIG. 1 is a side view of a hydraulic drive retrofittable in accordance with the subject invention.
Figure 2:
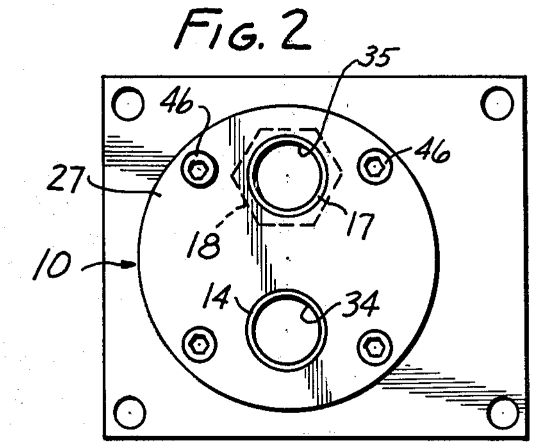
FIG. 2 is a top view of the drive shown in FIG. 1.

The illustrated hydraulic drive 10 may, for instance, be a motor of a hydraulic tool. By way of example, the drive 10 may be a so-called Hyrevz hydraulic motor manufactured by Stanley Hydraulic Tools, Division of the Stanley Works, of Milwaukie, Oreg. 97222. Of course, the principles and utility of the subject invention are not limited to any particular hydraulic drive, tool or make.

The hydraulic drive 10 has a preferably cylindrical motor housing 12 which may be equipped with a mounting flange 13 for attachment to the frame of a tool or other structure. The drive 10 has an inlet opening 14 for receiving a first fitting 15 for a hydraulic fluid delivery hose 16, and an adjacent outlet opening 17 for receiving a second fitting 18 for a hydraulic fluid return hose 19. The term "hose" as herein employed is intended to be broad enough to cover also piping and tubing and hydraulic fluid lines in general.

By way of example, the hydraulic fluid delivery hose 16 may be connected to an outlet of a hydraulic power source or pump supplying pressurized oil or other hydraulic fluid to the drive 10. The return hose, on the other hand, may be connected to a reservoir of the hydraulic power source. The pump of the power source may then repressurize the returned hydraulic fluid and recirculate such fluid through the delivery hose 16 and drive 10.

A turbine, gear-type motor mechanism or other means 21 driven by the hydraulic fluid may be located in the housing 12 and connected between the inlet and outlet openings 14 and 17. The motor means 21 have an output shaft 22 for driving a tool or other mechanism. By way of example and not by way of limitation, tools on which the subject invention may be employed include saws, such as concrete wall saws, drilling and coring equipment, such as concrete drilling and coring machines, hydraulically driven electric generators and alternators, ventilating fans, air compressors, pumps and the like.

According to the subject invention, a block 23 is retrofitted on the drive 10 in order to provide an on-off switching or a valving facility. A rectangle 24 in FIG. 3 symbolizes machining, drilling and outfitting operations for preparing and equipping the block 23 according to a preferred embodiment of the subject invention. In particular, the block 23 is provided with a front portion 26 fitting a corresponding surface or portion 27 of the drive at the adjacent inlet and outlet openings 14 and 17. The block 23 is further provided with a rear portion 28 opposite the front portion 26.

The block 23 is also provided with a first through-opening 31 leading from the rear portion 28 to the front portion 26 for communication with the inlet opening 14 of the drive 10. The block 23 is further provided with a second through-opening 32 leading from the rear portion 28 to the front portion 26 for communicating with the outlet opening 17.

By way of background, it will be noted in this respect that the inlet opening 14 is adapted, such as by means of a thread 34, to receive the first fitting 15 of the hydraulic fluid delivery hose 16, which may have a threaded nipple for this purpose engaging the thread 34 of the inlet opening. Similarly, the outlet opening 17 of the drive 10 may be adapted, such as by means of a thread 35, to receive the second fitting 18 for the hydraulic fluid return hose 19.

According to the subject invention, the first through-opening 31 is adapted at the rear portion 28 for reception of the first fitting 15 of the fluid delivery hose 16, and is further adapted at the rear portion 28 for reception of the second fitting 18 of the hydraulic fluid return hose 19. To this end, the block 23, at the rear portion 28 and first through-opening 31, may be provided with a thread 36 corresponding to the thread 34 of the inlet opening 14. Similarly, the block 36 at the rear portion 28 and second through-opening 32 may be provided with a thread 37 corresponding to the thread 35 of the outlet opening 17 of the hydraulic drive 10.

Further according to the subject invention, the block 23 is provided with a valve 41 being manually actuable between an open position and a closed position. The valve 41 has a transverse through-opening 42 for providing in its open position shown in FIG. 3 an interconnection 43 between the through-openings 31 and 32, in order to deactivate the drive 10.

In its closed position, in which the valve opening 42 extends in parallel to the through-openings 31 and 32, the valve 41 blocks the interconnection 43 between the through-openings 31 and 32, for a reactivation of the drive 10.

The block 23 is mounted on the drive 10, with its front portion 26 fitting the drive at the inlet and outlet openings 14 and 17 or at the surface or end portion 27. The first through-opening 31 thereby communicates with the inlet opening 14, and the second through-opening 32 communicates with the outlet opening 17.

Suitable fasteners, such as screws 45, may be employed for mounting the block 23 on the drive 10 and for releasably attaching such block to the hydraulic drive. If desired, the screws 45 may be of the same type as similar screws 46 employed in the drive 10 for attaching the end portion 27 to the remainder of the housing 12. In other words, the screws 46 may be removed from the drive and longer screws 45 inserted instead in order to attach the block 23 and end portion 27 to the cylindrical housing 12 of the fluid drive.

Figure 4:
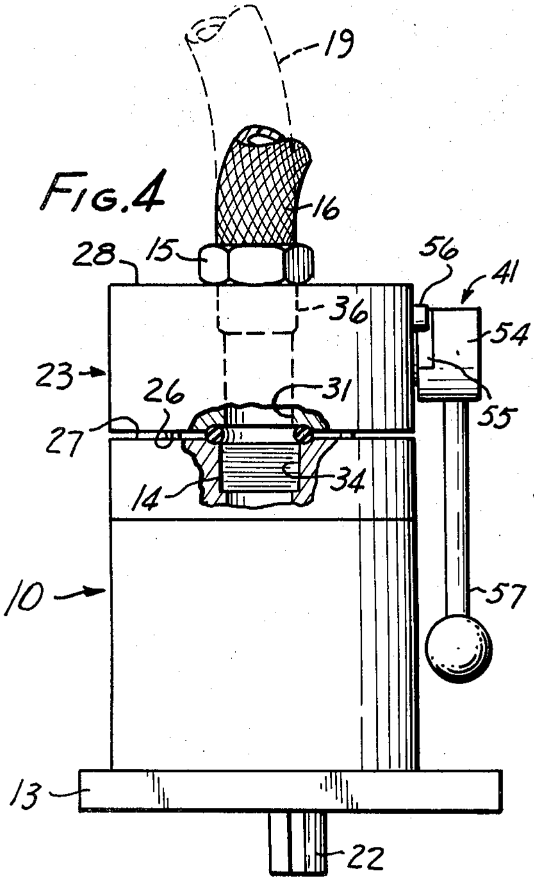
FIG. 4 is a side view of a retrofitted hydraulic drive according to a preferred embodiment of the subject invention.
Figure 5:
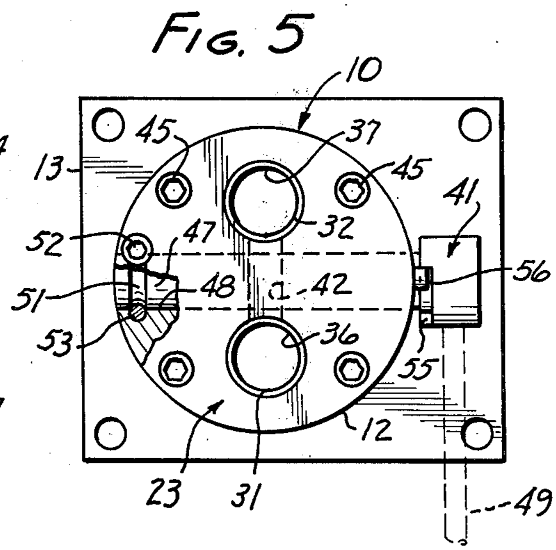
FIG. 5 is a top view of the retrofitted hydraulic drive shown in FIG. 4.

To provide for a compact and effective unit, the block 23 at the front portion 26 is or is made congruent with the drive 10 or housing 12 at the adjacent inlet and outlet openings 14 and 17. Where the drive has a cylindrical housing 12, the block 23 is or is provided as a cylindrical extension of the housing 12. Preferably, the drive 10 or housing 12 and the block 23 have or are provided with congruent cylindrical configurations, as shown in FIGS. 4 and 5.

In accordance with the illustrated preferred embodiment of the subject invention, the first and second through-openings 31 and 32 in the block 23 are provided or extend parallel to a longitudinal axis of the cylindrical housing 12. The interconnection 43, on the other hand, extends or is provided at an angle to that longitudinal axis, such as at a right angle, as seen in FIG. 3.

The valve 41 is made to stay in its open position until manually actuated to its closed position, and is made to stay in its closed position until manually actuated to its open position. In other words, the valve means 41 are of a type staying in an open position until manually actuated to a closed position, and staying in a closed position until manually actuated to an open position. This distinguishes the valve means according to the illustrated preferred embodiment of the subject invention from the type of spring-biased valves that have to be manually maintained in an active position, and that will automatically revert to their closed position whenever their manual acting engagement is released. In many applications, such as concrete saws and coring equipment, it would be inconvenient if not impossible for the worker or operator to maintain the hydraulic drive actuated by constant manual engagement of a valve mechanism.

The valve 41 preferably has a cylindrical bobbin 47 extending in a bore 48 at right angles to a longitudinal axis of the cylindrical block 23. As shown in FIG. 3, the valve opening or hole 42 extends transversely of the valve bobbin 47.

Figure 3:
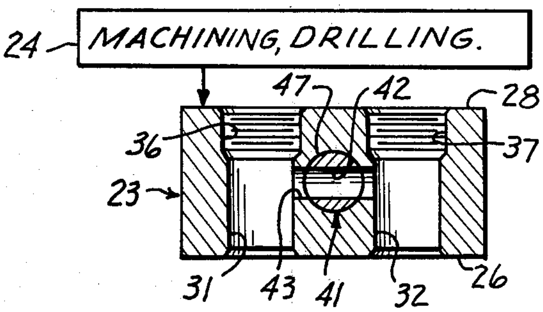
FIG. 3 is a section through a retrofitting block according to a preferred embodiment of the subject invention.

In practice, the valve opening 42 and the interconnection 43 will, of course, be of sufficient diameter to assure that the hydraulic fluid circulating through the hoses 16 and 19 completely biases the motor 21 when the valve is in its open position shown in FIG. 3, whereby the motor 21 is effectively stopped.

The valve 41 is manually rotatable from its open position shown in FIGS. 3 and 4 to its closed position indicated in FIG. 5 by dotted lines 49. In other words, the valve 41 may be actuable between its open and closed positions through a 90° turn.

The valve bobbin may have a circumferential groove 51 and stems of screws 52 and 53 may project into such groove in order to releasably retain the valve in the block 23.

The valve 41 may further have a collar 54 at the end of the bobbin 47. The collar 54 has a 90° groove 55 cooperating with a pin 56 attached to the block 23 in order to restrain the valve against excessive travel beyond its open and closed positions. A handle 57 laterally projects from the collar 54 to provide the valve 41 with a manually actuable facility.

The subject invention and its illustrated preferred embodiments meet all of the initially stated objectives, while satisfying the above mentioned needs.

In particular, the subject invention enables a retrofitting of existing or basic drives and provides retrofitted units with reliable and convenient on-off switches or valving facilities greatly superior to prior approaches or equipment in terms of reliability, safety, ruggedness, versatility and utility.

The subject extensive disclosure will suggest or render apparent to those skilled in the art various modifications and variations within the spirit and scope of the subject invention.

I claim:

1. A method of retrofitting a hydraulic drive having an inlet opening for receiving a first fitting for a hydraulic fluid delivery hose and an adjacent outlet opening for receiving a second fitting for a hydraulic fluid return hose, comprising in combination the steps of:

providing a block having a front portion fitting said drive at said adjacent inlet and outlet openings, and a rear portion opposite said front portion;

providing said block with a first through-opening leading from said rear portion to said front portion for communication with said inlet opening, and with a second through-opening leading from said rear portion to said front portion for communication with said outlet opening;

adapting at said rear portion said first through-opening for reception of said first fitting and said second through-opening for reception of said second fitting;

providing in said block a valve being manually actuable between an open position providing an interconnection between said through-openings for deactivating said drive and a closed position blocking said interconnection for reactivation of said drive; and mounting said block on said drive with said front portion fitting said drive at said inlet and outlet openings, said first through-opening communicating with said inlet opening, and said second through-opening communicating with said outlet opening.

2. A method as claimed in claim 1, wherein:

said block at said front portion is made congruent with said drive at said adjacent inlet and outlet openings.

3. A method as claimed in claim 1, wherein:

said drive has a cylindrical housing; and said block is provided as a cylindrical extension of said housing.

4. A method as claimed in claim 1, wherein:

said drive and said block are provided with congruent cylindrical configurations.

5. A method as claimed in claim 1, wherein:

said drive has a cylindrical housing;

said first and second through-openings are provided parallel to a longitudinal axis of said cylindrical housing; and said interconnection is provided at an angle to said longitudinal axis.

6. A method as claimed in claim 1, 2, 3, 4 or 5, wherein:

said valve is made to stay in said open position until manually actuated to said closed position, and is made to stay in said closed position until manually actuated to said open position.

7. A hydraulic drive having an inlet opening adapted for reception of a first fitting for a hydraulic fluid delivery hose, an adjacent outlet opening adapted for reception of a second fitting for a hydraulic fluid return hose, and means connected between said inlet and outlet openings and driven by said hydraulic fluid, said hydraulic drive having been retrofitted by a method comprising in combination the steps of:

providing a block having a front portion fitting said drive at said adjacent inlet and outlet openings, and a rear portion opposite said front portion;

providing said block with a first through-opening leading from said rear portion to said front portion for communication with said inlet opening, and with a second through-opening leading from said rear portion to said front portion for communication with said outlet opening;

adapting at said rear portion said first through-opening for reception of said first fitting and said second through-opening for reception of said second fitting;

providing in said block a valve being manually actuable between an open position providing an interconnection between said through-openings for deactivating said driven means and a closed position blocking said interconnection for reactivation of said driven means; and mounting said block on said drive with said front portion fitting said drive at said inlet and outlet openings, said first through-opening communicating with said inlet opening, and said second through-opening communicating with said outlet opening.

8. A hydraulic drive as claimed in claim 7, wherein:

said block at said front portion is made congruent with said drive at said adjacent inlet and outlet openings.

9. A hydraulic drive as claimed in claim 7, wherein:

said drive has a cylindrical housing; and said block is provided as a cylindrical extension of said housing.

10. A hydraulic drive as claimed in claim 7, wherein:

said drive and said block are provided with congruent cylindrical configurations.

11. A hydraulic drive as claimed in claim 7, wherein:

said drive has a cylindrical housing;

said first and second through-openings are provided parallel to a longitudinal axis of said cylindrical housing; and said interconnection is provided at an angle to said longitudinal axis.

12. A hydraulic drive as claimed in claim 7, 8, 9, 10 or 11, wherein:

said valve is made to stay in said open position until manually actuated to said closed position, and is made to stay in said closed position until manually actuated to said open position.

13. A hydraulic drive comprising in combination:

an inlet opening adapted for reception of a first fitting for a hydraulic fluid delivery hose;

an adjacent outlet opening adapted for reception of a second fitting for a hydraulic fluid return hose;

means connected between said inlet and outlet openings and driven by said hydraulic fluid;

a block retrofitted on said drive and having a front portion at said adjacent inlet and outlet openings, and a rear portion opposite said front portion;

a first through-opening leading from said rear portion to said front portion for communication with said inlet opening and being adapted for reception of said first fitting at said rear portion;

a second through-opening leading from said rear portion to said front portion for communication with said outlet opening and being adapted for reception of said second fitting at said rear portion; and valve means in said retrofitted block manually actuable between an open position providing an interconnection between said through-openings for deactivating said driven means and a closed position blocking said interconnection for reactivation of said driven means.

14. A hydraulic drive as claimed in claim 13, wherein:

said block at said front portion is congruent with said drive at said inlet and outlet openings.

15. A hydraulic drive as claimed in claim 13, wherein:

said drive has a cylindrical housing; and said block is a cylindrical extension of said housing.

16. A hydraulic drive as claimed in claim 13, wherein:

said drive and said block have congruent cylindrical configurations.

17. A hydraulic drive as claimed in claim 13, wherein:

said drive has a cylindrical housing;

said first and second through-openings extend parallel to a longitudinal axis of said cylindrical housing; and said interconnection extends at an angle to said longitudinal axis.

18. A hydraulic drive as claimed in claim 13, 14, 15, 16 or 17, wherein:

said valve means are of a type staying in said open position until manually actuated to said closed position, and staying in said closed position until manually actuated to said open position.

* * * * *